June 7, 1927.  1,631,269
P. JARAY
MOTOR CAR
Filed Aug. 19 1922  2 Sheets-Sheet 1
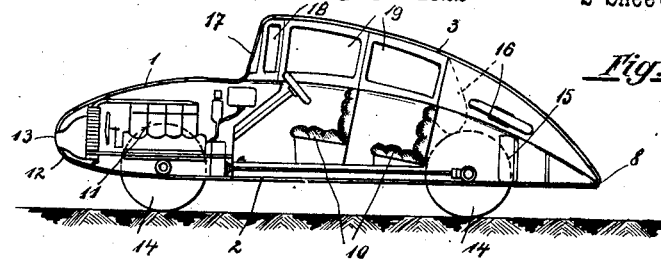
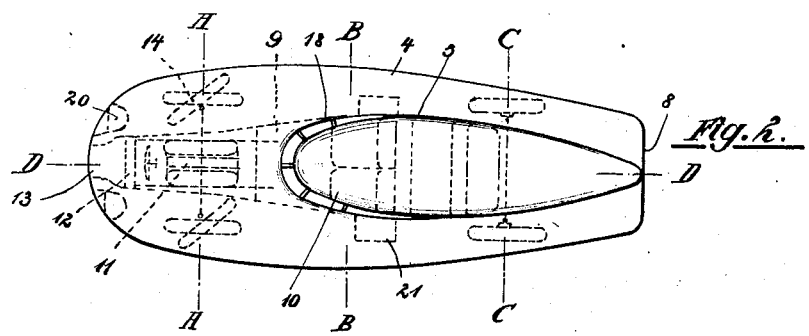
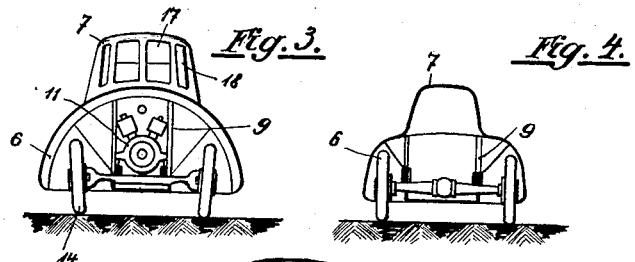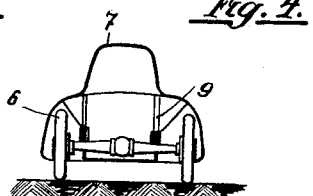
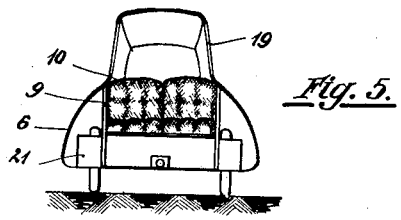
Inventor:
Paul Jaray
by [signature]
Attorney

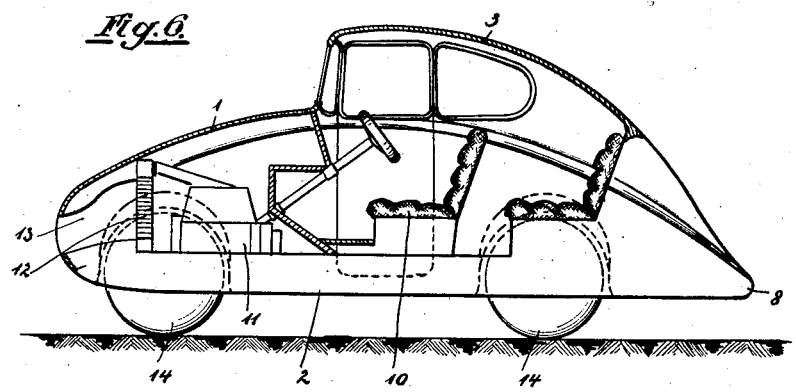
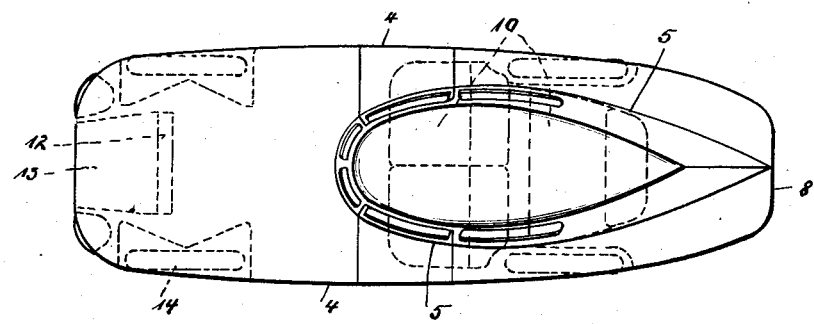
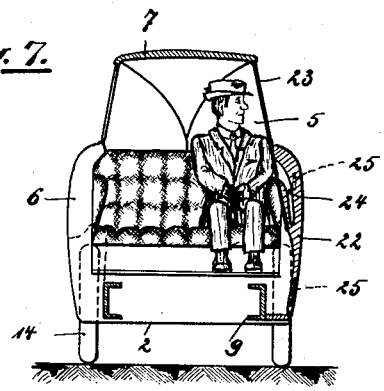

Patented June 7, 1927.

1,631,269

UNITED STATES PATENT OFFICE.

PAUL JARAY, OF FRIEDRICHSHAFEN, GERMANY.

MOTOR CAR.

Application filed August 19, 1922, Serial No. 582,975, and in Germany January 31, 1922.

My invention relates to motor cars and more especially to the construction and configuration of the body and the top of power vehicles, the intention being to reduce the resistance to air in the highest degree attainable, as well as to diminish as much as possible the raising of dust. I attain these objects by providing for an appropriate guidance of the currents of air. I am aware of the fact that it has already been proposed to shape, for diminishing the resistance to air of the vehicle, the various parts of this latter in such a manner that a more favourable discharge of the air could be expected. Thus, for instance, the spokes of the wheels have been enclosed; the whole car has received a low and slender shape, and quite especially the body has been shaped somewhat like a torpedo or like an airship body. By all such contrivances, however, only little is attained as regards diminishing the resistance to air, as well as diminishing the raising of dust, because, on the one side, the whole combination of parts, viz. the frame, the body with its top, the wheels with their accessories, the mudguards, and the like, entail such a bad guidance of the stream lines that the improvement in the shape of the various individual parts of the car cannot produce a perceptible effect, the less so, as most of the parts concerned are situated in a space that is filled with eddies. On the other hand, enclosing all parts in a body, the shape of which resembles that of an air-ship body is not suited to the purpose for the reason that the necessary free look-out of the driver is impeded and steering the vehicle is, therefore, rendered difficult, if not, perhaps, made impossible. An important characteristic feature of such unsuited shapes, for instance the shape of an air-ship body, is the well known fact that they raise great quantities of dust. There is a certain definite relation between the resistance of the air, the consumption of power to overcome that resistance, and the raising of dust, and it is in consequence of that relation that bodies offering a great resistance give rise to the formation of eddies.

The motor cars hitherto built deflect in most cases the air to the sides of the car, transversely to the road, there being at the same time produced a correspondingly great resistance, a loss of power, strong eddies, and, at the rear of the car, an obliquely upwards directed air current, combined with a very considerable partial vacuum, whereby the dust is torn upwards into the eddies following the car. These undesirable effects are favoured by the many projecting parts of the car, such, for instance, as the driving-gear boxes, the differential axes, the springs, and the like, these and other projecting parts loosening and raising the dust already whilst the car is running. Besides, the rear car surface which, with most cars, is rearwardly inclined in upward direction, acts as a guide for the whirling-up dust-laden air.

The present invention obviates the above-mentioned drawbacks by enclosing practically all material parts of the vehicle, i. e. the entire driving plant, the useful spaces, the seats, the baggage holder, the under-frame, the upper portions of the wheel, and so on, in a body-forming shell having practically the shape of one half of a stream line body, the section plane of which extends practically parallel to the road, this shell or body deflecting the air chiefly upwards, as well as rearwards over its top and then down to the bottom with the least disturbance possible.

The half stream-lined shell or body may carry another body portion or top which affords the driver and the passenger a free look-out and is shaped conformably to the lower main portion, especially at its rear, and with special consideration to the guidance of the air.

The windows of the upper stream-lined body are preferably so arranged that the observation windows proper are situated at the bow, at the place of the greatest dynamic pressure, so that, the car being otherwise closed, they may be opened in a certain measure without the persons in the car being molested by the wind arising during the running. This wind increases slightly the pressure within the car, but has no sufficient discharge. But the adjacent lateral windows located at the left and at the right side of the car, as it were, at the shoulders of the stream line body, preferably remain closed, because they are situated in the range of the greatest partial vacuum. The other lateral windows, that may be turnable in hinges or slidable by feather and groove, may be at least partly opened without any particular damage to the persons inside the car, if the bow window or windows is or are closed; said windows lie in the range of a but slight partial vacuum and give rise to a draught only if wind is blowing from the one or the other side.

In the constructional design the supporting structure of the upper stream line body is preferably continued to and into that of the lower stream-lined body and is there supported directly by the frame girders which may extend underneath the axles of the car. This supporting structure forms the longitudinal bond or bracing proper of the vehicle, the upper girths of which, following, for instance, the course of the stream lines in the direction from bow to stern, extend to about the broadest place of the upper body, pass then upwards to the top or the roof through the bracings of the window carriers, and finally extend downwards to the stern. The extension or continuation of the upper girths of the lower stream-lined body is preferably cut out at the places of the entrance-openings, or doors respectively, or is placed so much deeper that the car may be conveniently entered at either side. The side walls of the lower body which project laterally over the wheels are suspended like brackets and may, if requisite, be subdivided by single lengthwise extending girders held in place by braces projecting forth from the lower girth. If the frame passes through below the axles, a simple and smooth understructure is obtained; the springs supporting the axles may be affixed either to the lower girths of the longitudinal bond or bracing or may be inserted in a suitable manner into this bracing itself.

The motor and the gearing which may be provided may be arranged in the usual manner. An important point, however, is that no parts, including the driving-gear box and the casing of the differential gear and similar members, project beyond the outer surfaces. These latter are subdivided in the usual manner in fields, as with the ordinary motor car bodies, and may be turned open or taken off to afford access to the various parts of the structure, and permit especially of inspecting the motor, the driving gear, and the like.

Conducting air to a radiator, if such a one is provided, as well as to the motor, is effected either by a well known ductor nozzle or by means of a fan driven by the motor, whereas the discharge of the air is effected either with aid of the exhaust-gases or through small slots or the like. The baggage and spare wheels and materials may particularly conveniently be accommodated in the pointed rear end of the upper stream line body, whereas the benzine tank may be arranged at the same place as now generally used for it.

My invention is illustrated, by way of example, in the accompanying drawings, in which Figure 1 is a longitudinal section in line D—D of Figure 2.

Figure 2 is a plan of this car.

Figures 3, 4, and 5 are transverse sections on the lines A—A, B—B, and C—C, respectively of Figure 2.

Figure 6 is an illustration similar to Figure 1 and shows a somewhat modified form of construction.

Figure 7 is a transverse section, taken right in front of the driver's seat.

Figure 8 is a plan of the car shown in Figure 7.

Referring to Figure 1, 1 is the upper stream line curve of the lower stream line body, and 2 is the practically straight bordering line of this body. 3 is the upper stream line curve of the upper body, and 4 and 5 (Figure 2) are the contour lines of both bodies in horizontal projection. Of these lines, 5 are stream lines proper, whereas the lines 4 are bent into obtuse angles at the rear edge 8 of the car. The lines 6 and 7 (Figures 3–5) show the shapes of the upper surfaces of the lower and the upper stream line body, and it is to be seen especially in Figure 5 how the lateral bordering lines of the upper body join the vertical parts of the longitudinal frame work.

Within the combined bodies are the seats 10, the motor 11, the radiator 12 with its air-supply duct 13, the fuel receptacle 15, the space 16 for baggage and spare parts also, if desired, for a storage battery, and other more or less important necessities.

The wheels 14, in the example illustrated in Figure 1, are covered by the lower stream line body to below their centres, so that the inner surfaces of the spaces containing the wheels may serve as substitutes for mud guards proper. Attention is, of course, paid to the necessity of slewing the steering wheels in the proper manner, as shown in the lefthand portion of Figure 2 by the dotted lines indicating the several positions of the steering wheels.

The bow windows 17 of the upper stream line body may be subdivided so that a part of the one or the other may be opened, whereas the side windows 18 are preferably firmly secured in place and cannot, therefore, be opened. The windows 19, however, may be movable; they may, for instance, be vertically displaceable in the respective parts of the longitudinal vertical frame work which may be interrupted at the respective portions of the car, and these portions may form the doors. Also the head lights are located inside the space enclosed by the lower body, as shown at 20 in Figure 2.

In the modification illustrated in Figures 6–8 the lateral portions of the lower stream line body are less vaulted than in Figures 3-5, in fact, considerably less. This body which encloses more than the upper halves of the wheels laterally, as well as at their upper portions, and whose own portions adjacent to the wheels serve again as mud guards, is so shaped that the outer surfaces of the wheels (the spokes of each of which may be covered with a common disk located at the outer side of the wheel) lie practically flush with the lateral body surfaces indicated by the lines 4. These surfaces appear as being cut out at the wheels, but there are inner supplemental walls of such a shape that the wheels may be properly slewed as necessary for the steering (see the respective dotted lines in the lefthand portion of Figure 8).

Owing to that configuration of the car body, i. e. of the lower stream line body, the breadth of the car is considerably diminished, without, however, any diminution of the aerodynamic effect because of the lesser vaulting of the car sides.

The stream line curve 1 of the lower body is broken, or divided respectively, by the upper body, at the sides of which it joins the stream line curves 5 of the same; these lines join in their turn, at the rear edge 8 of the car, the stream line curves 3 of the upper body 7, as well as the practically horizontal bottom line 2. The curves 4 are very flat and the outer planes of the wheels are nearly flush with these curves. The bordering lines 5 of the upper body 7 lie between the lines 4 and enclose chiefly only the heads of the persons inside the car, whereas the seats 10 extend nearly to said lines 4, the side walls of the lower body appearing erected upon the frames 9. For the rest, 11 is again the motor, 12 a radiator, and 13 an air supply channel for the latter, and these parts are again located at the head of the car, as usual.

The spaces between the interior of the car and the outer walls, at the sides of the car, may be utilized in any desired way. To the rear of the doors 22 a sliding window 23 and a pocket 24 may be provided serving for the reception of maps or the like.

I wish it to be understood that I do not desire to be limited to the exact details of construction shown and described, for obvious modifications will occur to a person skilled in the art.

I claim:

1. A motor car comprising a hull streamlined in front and on top, the bottom being substantially plane at the fore part and plane therefrom to aft.

2. A motor car comprising a hull streamlined in front and on top, the bottom being substantially plane from fore to aft and ending in a broad edge.

3. A motor car comprising a complete hull shaped substantially like the upper half of a streamlined body.

4. A motor car comprising a hull shaped substantially like the upper half of a streamlined body, the rear end of which terminates in a transverse edge.

5. A motor car comprising a hull shaped substantially like the upper half of a streamlined body, the front and rear ends of which terminate in transverse edges.

6. A motor car comprising a hull shaped substantially like the upper half of a streamlined body, the rear end of which terminates in a transverse edge substantially at a level with the bottom of said body.

7. A motor car comprising a hull streamlined in front and on top, the bottom being substantially plane from fore to aft, and wheels having their upper halves surrounded by said hull.

8. A motor car comprising a chassis, a motor, a seat and wheels and an envelope having the form of one symmetric half of a drop and entirely surrounding said chassis, motor and seat and the upper halves of said wheels.

9. A motor car comprising a shell, the vertical longitudinal section of which substantially resembles the vertical longitudinal section of the upper half of a stream line body, and a materially shorter hood similar in vertical longitudinal section mounted on top of and substantially on the rear half of said shell.

10. A motor car comprising a shell, the vertical longitudinal section of which substantially resembles the vertical longitudinal section of the upper half of a stream line body, and a materially shorter and narrower hood similar in vertical longitudinal section mounted on top of and substantially on the rear half of said shell.

11. A motor car comprising a shell, the vertical longitudinal section of which substantially resembles the vertical longitudinal section of the upper half of a stream line body, and a materially shorter hood similar in vertical longitudinal section mounted on top of and substantially on the rear half of said shell, structural parts of said hood extending downwards into and forming part of the framework of said shell, the outer portions of said shell being suspended from said structural parts.

12. A motor car comprising a body the vertical longitudinal section of which substantially resembles the vertical longitudinal section of the upper half of a stream line body, the plane of symmetry of which being the surface of the ground.

In testimony whereof I affix my signature.

PAUL JARAY.